United States Patent
Dietrich et al.

(10) Patent No.: US 10,370,164 B2
(45) Date of Patent: Aug. 6, 2019

(54) COMPOSITE FILM

(71) Applicant: AMCOR FLEXIBLES SINGEN GMBH, Singen (DE)

(72) Inventors: Christoph Dietrich, Singen (DE); Klaus Hafner, Fridingen (DE); Sven Bauer, Steisslingen (DE)

(73) Assignee: AMCOR FLEXIBLES SINGEN GMBH, Singen (DE)

( * ) Notice: Subject to any disclaimer, the term of this patent is extended or adjusted under 35 U.S.C. 154(b) by 0 days.

(21) Appl. No.: 15/699,287

(22) Filed: Sep. 8, 2017

(65) Prior Publication Data

US 2018/0022520 A1    Jan. 25, 2018

Related U.S. Application Data

(62) Division of application No. 14/001,225, filed as application No. PCT/EP2012/000732 on Feb. 20, 2012, now Pat. No. 9,790,010.

(30) Foreign Application Priority Data

Feb. 25, 2011   (EP) ..................................... 11001574

(51) Int. Cl.
  *B65D 53/00*   (2006.01)
  *B32B 7/06*    (2019.01)
  (Continued)

(52) U.S. Cl.
  CPC ............... *B65D 53/00* (2013.01); *B32B 7/06* (2013.01); *B32B 15/08* (2013.01); *B32B 15/20* (2013.01);
  (Continued)

(58) Field of Classification Search
  CPC ............... B65D 53/00; B65D 77/2024; B65D 77/2044; B65D 75/5855;
  (Continued)

(56) References Cited

U.S. PATENT DOCUMENTS 3,187,931 A * 6/1965 Henchert ............. B65D 17/163
                                                    220/270
3,339,788 A * 9/1967 Lipske ................. B65D 17/505
                                                    220/270
(Continued)

FOREIGN PATENT DOCUMENTS

DE    198 59 334      7/2000
EP      0312302       4/1989
(Continued)

OTHER PUBLICATIONS

Chinese Office Action dated Sep. 3, 2014 in Chinese Application No. 201280010216.5, including English translation.
(Continued)

*Primary Examiner* — Kareen K Thomas
(74) *Attorney, Agent, or Firm* — RatnerPrestia

(57) ABSTRACT

A composite film for closing a container by sealing the composite film against a circumferential sealing surface of the container or of a cap ring to be connected to the container has a support layer made of a metal film and a sealing layer connected to the metal film. The sealing layer comprises a coextruded layer with a cohesively breaking intermediate layer and adhesion promoter layers arranged on both sides of the intermediate layer. The composite film is suitable for tight sealing against sealing surfaces made of polished tinplate.

11 Claims, 1 Drawing Sheet

Figure 1:
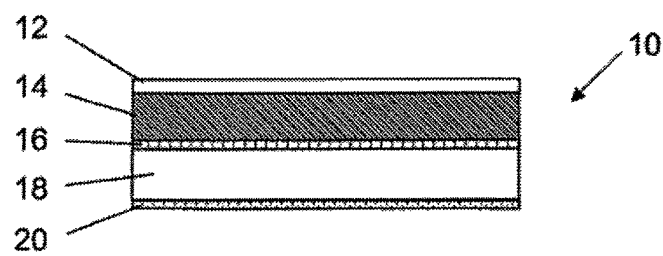

(51) Int. Cl.
  *B65D 77/20*   (2006.01)
  *B32B 15/08*   (2006.01)
  *B32B 15/20*   (2006.01)
  *B32B 27/08*   (2006.01)
  *B32B 27/32*   (2006.01)
  *B65D 75/58*   (2006.01)

(52) U.S. Cl.
  CPC ............. *B32B 27/08* (2013.01); *B32B 27/32* (2013.01); *B65D 77/2024* (2013.01); *B32B 2264/10* (2013.01); *B32B 2270/00* (2013.01); *B32B 2435/02* (2013.01); *B32B 2439/40* (2013.01); *B32B 2439/60* (2013.01); *B32B 2439/66* (2013.01); *B65D 75/5855* (2013.01); *B65D 77/2044* (2013.01); *B65D 2101/0023* (2013.01)

(58) Field of Classification Search
  CPC . B65D 2101/0023; B32B 15/20; B32B 15/08; B32B 27/32; B32B 27/08; B32B 7/06; B32B 2270/00; B32B 2439/66; B32B 2435/02; B32B 2439/60; B32B 2264/10; B32B 2439/40
  USPC .......... 220/359.1–359.5, 359, 265, 266, 268, 220/269; 215/250, 253, 254, 256
  See application file for complete search history.

(56) References Cited

U.S. PATENT DOCUMENTS

| | | | | |
|---|---|---|---|---|
| 3,735,893 A | * | 5/1973 | Gayner | B65D 17/4011 220/270 |
| 3,952,698 A | * | 4/1976 | Beyer | B05B 13/00 118/314 |
| 4,403,710 A | * | 9/1983 | Hirota | B21D 51/383 220/270 |
| 4,673,601 A | * | 6/1987 | Lamping | B65D 75/52 220/266 |
| 4,917,260 A | * | 4/1990 | Heyes | B65D 17/507 220/269 |
| 5,112,695 A | * | 5/1992 | Watanabe | B21D 51/383 428/458 |
| 5,145,737 A | | 9/1992 | Boiron | |
| 5,208,103 A | | 5/1993 | Miyamoto | |
| 5,965,254 A | | 10/1999 | Christopherson et al. | |
| 2004/0151932 A1 | * | 8/2004 | Galloway | B32B 7/06 428/515 |
| 2006/0141241 A1 | | 6/2006 | Carespodi | |
| 2007/0054071 A1 | | 3/2007 | Nageli | |
| 2011/0186465 A1 | * | 8/2011 | Riley | B65D 1/165 206/524.6 |

FOREIGN PATENT DOCUMENTS

| | | |
|---|---|---|
| EP | 1 484 259 | 12/2004 |
| EP | 1 762 378 | 3/2007 |
| GB | 2003415 | 3/1979 |
| WO | 2006042940 | 4/2006 |

OTHER PUBLICATIONS

Schultz et al., "Adhesion Mechanisms of Grafted Polyolefins", Makromol Chem., Marcomol, Symp., 1989, vol. 23, pp. 343-353.
Pusset et al., "Adhesive Properties of Grafted Polypropylenes on Aluminum", Conference Euradh 94, 1995, 11 pages.
International Search Report for Application No. PCT/EP2012/000732, dated Aug. 13, 2012 (w/ English language translation of relevance).

* cited by examiner

COMPOSITE FILM

CROSS-REFERENCE TO RELATED APPLICATIONS

This is a divisional application of U.S. patent application Ser. No. 14/001,225, filed Aug. 23, 2013, which is a U.S. National Phase application of International Application No. PCT/EP2012/000732, filed Feb. 20, 2012, which claims priority benefit of European Application No. 11 001 574.0, filed Feb. 25, 2011, all of which are incorporated herein by reference in their entireties for all purposes.

FIELD OF THE INVENTION

The present invention pertains to a composite film comprising a support layer made of a metal film and a sealing layer connected to the metal film for closing a container by sealing the composite film against a circumferential sealing surface of the container or of a cap ring to be connected to the container. A container or a cap ring for connecting to a container, to a circumferential sealing surface made of polished tinplate, with a closing membrane made of the composite film, which is sealed onto the sealing surface and can be peeled from the sealing surface, is also within the scope of the present invention.

BACKGROUND OF THE INVENTION

Closing membranes made of a composite film comprising a support layer made of an aluminum film and a sealing layer connected to the aluminum film for closing a container by sealing the composite film against a circumferential sealing surface of the container or of a cap ring to be connected to the container are known.

For the tight closing of containers made of tinplate or of containers with a cap ring made of tinplate by sealing a closing membrane onto a circumferential sealing surface, the sealing surface had, up until now, to be provided with a heat-sealable coating in order to make the sealing of the closing membrane resistant against temperature fluctuations and pressure fluctuations in the interior of the can.

BRIEF SUMMARY OF THE INVENTION

The basic object of the present invention is to create a composite film suitable as closing membrane for a container or a cap ring to be connected to a container, which makes possible a robust tight sealing both against uncoated metal sealing surfaces, in particular sealing surfaces made of polished tinplate or polished aluminum, as well as against heat-sealable, modified sealing surfaces. Another object of the present invention is the simultaneous providing of an easily recognizable tamper-proof seal in the form of a "footprint." A footprint is designated as a visually recognizable portion of the sealing medium of the closing membrane remaining behind on the sealing partner.

DETAILED DESCRIPTION OF CERTAIN EMBODIMENTS OF THE INVENTION

A composite film having the features of claim 1 leads to accomplishing the object of the present invention.

The intermediate layer may comprise one or more layers. A polypropylene modified with maleic acid anhydride (PP-MAH) is used as adhesion promoter, a thermoplastic containing polypropylene (PP) as an essential component, i.e., with more than 50 wt. % PP is used as the intermediate layer.

When detaching a closing membrane made of the composite film according to the present invention and sealed against a circumferential sealing surface of a container or of a cap ring connected to the container, the material separation takes place within the cohesively breaking intermediate layer, a part of which remains behind on the sealing surface of the container or of the cap ring in the form of a uniform, visible footprint. This characteristic footprint is used for the immediate recognition of fake or manipulated packagings and can thus be used as a tamper-proof seal. Furthermore, it shows the final consumers that the packaging was sealed securely and hermetically.

The metal film, in particular an aluminum film, preferably has a thickness of 20 μm to 160 μm, and in particular 50 μm to 100 μm, the adhesion promoter layer has a thickness of 1 μm to 10 μm, and the cohesively breaking intermediate layer has a thickness of 5 μm to 60 μm.

The aluminum film may consist of the aluminum alloys usually used for closing membranes, e.g., EN AW 8011 and EN AW 8021, or of aluminum with the usual degree of purity, e.g., Al 98.6. A soft-annealed aluminum film is preferably used.

The side of the aluminum film facing away from the sealing layer and forming the outside may be provided, for example, with a protective coating, a laminated plastic film or paper, or with an imprint.

An especially preferred, cohesively breaking intermediate layer contains talc as an additive, wherein the talc content is preferably 5 wt. % to 49 wt. %, in particular 10 wt. % to 30 wt. %, of the cohesively breaking intermediate layer.

The cohesively breaking intermediate layer may contain, besides polypropylene (PP) as the main component, additionally also 5 wt. % to 35 wt. % of polyethylene (PE).

The composite film is particularly suitable for closing a container by sealing the composite film against a circumferential sealing surface of the container or of a cap ring to be connected to the container, wherein the sealing surface consists of polished tinplate.

Tinplate designates a thin, cold-rolled steel plate, whose surface is coated with tin. The tin coating is used, above all, for protection against corrosion. The tin layer of tinplate would—were it to remain unprotected—further oxidize due to the oxygen content of the air. Thus, a good coating adhesion is no longer guaranteed, however. Therefore, tinplate is usually subjected to a passivation treatment after the tinplating, by chromium and chromium oxide being applied on each side for improving the corrosion resistance. Moreover, the painting and printing properties are consequently improved. As tinplate passivation methods, the following methods are usually used (see also DIN standard EN 10202):

1. Code 300: Dip treatment in a chemical solution of a dichromate salt, wherein the chromium application per surface unit is 1.0 mg/m$^2$ to 3.0 mg/m$^2$.
2. Code 311: Cathodic treatment in a dichromate salt solution of an alkali metal, wherein the chromium application per surface unit is 3.5 mg/m$^2$ to 9.0 mg/m$^2$.
3. Code 314: Electrochemical passivation, wherein the chromium application per surface unit is 5 mg/m$^2$ to 9.0 mg/m$^2$.

A preferred polished tinplate is provided with a dip passivation (code 300), a cathodic passivation (code 311) or with an electrochemical passivation (code 314).

An essential criterion of the film according to the present invention is its cost-effective producibility by a multilayer coextrusion of the sealing layer consisting of an intermediate layer coated on both sides with an adhesion promoter layer each, wherein the coextrudate is preferably combined, after the extrusion process, with the support layer into the composite film according to the present invention.

Figure 2:
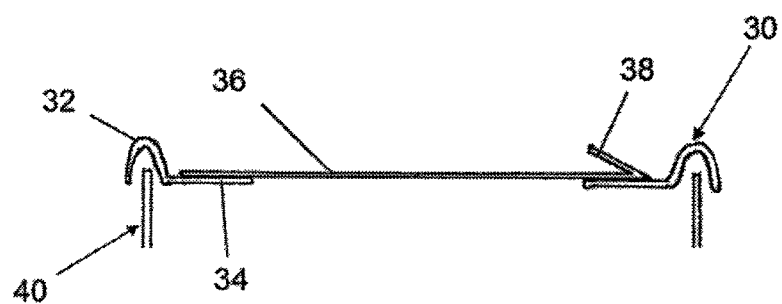
Figure 3:
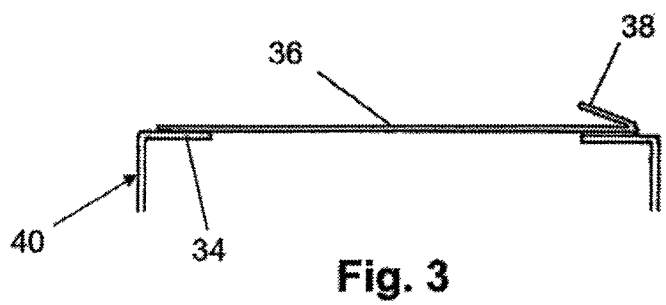
Figure 4:
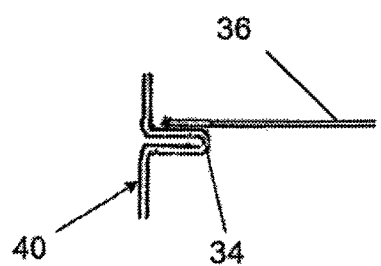

Further advantages, features and details of the present invention arise from the description below of preferred exemplary embodiments as well as on the basis of the drawing, in which FIG. 1 schematically shows the structure of a composite film according to the present invention;

FIG. 2 schematically shows a section through the cap ring with closing membrane;

FIG. 3 schematically shows a section through the opening area of a container with a closing membrane sealed on the outside of the container;

FIG. 4 schematically shows a section through the opening area of a container with a closing membrane sealed on the inside of the container.

A composite film 10 shown in FIG. 1 has the following structure:
12 Protective coating
14 Aluminum film
16 Adhesion promoter made of PP-MAH
18 Intermediate layer made of PP/PE with 5 wt. % to 49 wt. % talc
20 Adhesion promoter made of PP-MAH On a container closed with composite film 10, the protective coating 12 is directed at the container outside, and intermediate layer 18 with the adhesion promoter 20 is directed at the container inside.

A cap ring 30 made of tinplate with a beaded edge 32 for beading onto the opening edge of a container 40 shown in FIG. 2 has a ring-shaped, circumferential sealing surface 34, protruding horizontally inwards from the beaded edge 32. The sealing surface 34 is uncoated, i.e., the sealing surface 34 has a polished surface, like the remaining cap ring.

A closing membrane 36 punched out of the composite film 10, provided with a pull tab 38, is sealed onto the sealing surface 34. When peeling the closing membrane 36, the intermediate layer 18 breaks cohesively and a part of the intermediate layer 18 remains behind as a "footprint" on the sealing surface 34.

In FIG. 3, the sealing surface 34 is an integral part of the container 40 made of tinplate. The sealing surface 34 is formed here directly from the container 40 and is designed as a horizontally inwards directed ring flange. The outside of the container 40 and thus also the sealing surface 34 is uncoated, i.e., the sealing surface 34 has a polished tinplate surface. As described above for the cap ring 30, the intermediate layer 18 also remains behind here on the sealing surface 34 when opening by means of peeling as a consequence of the cohesive break as a "footprint" on the sealing surface 34.

In FIG. 4, the sealing surface 34 is an integral part of the container 40 made of tinplate. The sealing surface 34 is formed here directly from the container 40 and is designed as a horizontally inwards directed ring flange. The inside of the container 40 and thus also the sealing surface 34 is uncoated, i.e., the sealing surface 34 has a polished tinplate surface. As described above for the cap ring 30, the intermediate layer 18 also remains behind here on the sealing surface 34 when opening by means of peeling as a consequence of the cohesive break as a "footprint" on the sealing surface 34.

When detaching the closing membrane 36 sealed against the sealing surface 34 by pulling on the pull tab 38, the material separation takes place in the interior of the intermediate layer 18. After the complete removal of the closing membrane 36 for the first-time opening of the container 40, a part of the intermediate layer 18 remains behind as a uniform coating on the sealing surface 34. This coating or footprint is used as proof that can be recognized simply and without further aid of an original packaging with tamper-proof seal.

Test Examples

Tests on adhesive strength on tinplate with polished and coated surface and on peelability were carried out on composite films with the following layer structures.

A. 1.5 μm protective coating
   60 μm aluminum film EN AW-8021/AlFe1.5 soft-annealed
   4.5 μm PP-MAH
   11 μm PP with 40% talc+LDPE
   1.5 μm PP-MAH B. 1.5 μm protective coating
   90 μm aluminum film EN AW-8021/AlFeSi (A) soft-annealed
   4.5 μm PP-MAH
   11 μm PP with 40% talc+LDPE
   1.5 μm PP-MAH C. 1.5 μm protective coating
   60 μm aluminum film EN AW-8021/AlFe1.5 soft-annealed
   1.5 μm PP-MAH
   11 μm PP with 40% talc+LDPE
   4.5 μm PP-MAH D. 1.5 μm protective coating
   90 μm aluminum film EN AW-8011 (A)/AlFeSi (A)
   1.5 μm PP-MAH
   11 μm PP with 40% talc+LDPE
   4.5 μm PP-MAH E. 1.5 μm protective coating
   60 μm aluminum film EN AW-8021/AlFe1.5 soft-annealed
   4.0 μm PP-MAH
   11 μm PP with 40% talc+LDPE
   2.0 μm PP-MAH F. 1.5 μm protective coating
   60 μm aluminum film EN AW-8021/AlFe1.5 soft-annealed
   8.0 μm PP-MAH
   11 μm PP with 40% talc+LDPE
   4.0 μm PP-MAH The composite films were subjected to a peel test for determining the sealing seam strength. The composite films were sealed under comparable sealing conditions in the form of 15-mm-wide strips against a tinplate surface.

The force needed to detach the strips from the plate support was determined as indicator of the sealing seam strength. The pull-off angle of the strips against the tinplate surface displaceable on a carriage was always 90°.

All composite films with the structure according to the present invention showed comparable peel forces and sealing seam strengths in the peel tests with polished tinplate. The coating remaining behind as a footprint on the tinplate was white in all cases tested. Comparison tests with polished tinplate as a reference showed that comparable sealing seam strengths are obtained with polished tinplate.

Peel tests with tinplates with different passivations showed no differences in sealing seam strength in the usual passivations according to the codes 300, 311 and 314. Also, the aging occurring during the passivations had no effect on the sealing seam strength, i.e., the composite film reacts neutrally to the aging of the tinplate.

What is claimed is:

1. A composite film with a support layer made of a metal film and a sealing layer connected to the metal film for closing a container by sealing the composite film against a circumferential sealing surface of the container or of a cap ring to be connected to the container, wherein the sealing layer comprises a coextruded layer with a cohesively breaking intermediate layer and adhesion promoter layers arranged on both sides of the intermediate layer, and wherein the adhesion promoter layers are made of a polypropylene modified with maleic acid anhydride (PP-MAH) and a thermoplastic plastic containing more than 50% weight polypropylene (PP) is used as the intermediate layer.

2. The composite film in accordance with claim 1, wherein the metal film has a thickness of 20 μm to 160 μm, the adhesion promoter layer has a thickness of 1 μm to 10 μm, and the cohesively breaking intermediate layer has a thickness of 5 μm to 60 μm.

3. The composite film in accordance with claim 1, wherein the cohesively breaking intermediate layer contains talc as an additive.

4. The composite film in accordance with claim 3, wherein the talc content is 5% weight to 49% weight of the cohesive breaking intermediate layer.

5. The composite film in accordance with claim 1, wherein the cohesively breaking intermediate layer contains 5% weight to 35% weight of polyethylene (PE).

6. A container or cap ring for connecting to a container, with a circumferential sealing surface made of polished tinplate, wherein a closing membrane made of a composite film in accordance with claim 1, peelable from the sealing surface, is sealed onto the sealing surface.

7. The container in accordance with claim 6, wherein the tinplate is provided with a chromium application of 1 $mg/m^2$ to 3 $mg/m^2$ by a dip passivation, with a chromium application of 3.5 $mg/m^2$ to 9 $mg/m^2$ by a cathodic passivation or with a chromium application of 5 $mg/m^2$ to 9 $mg/m^2$ by an electrochemical passivation.

8. The composite film in accordance with claim 1, wherein the metal film is an aluminum film.

9. The composite film in accordance with claim 1, wherein the metal film has a thickness of 50 μm to 100 μm.

10. The composite film in accordance with claim 3, wherein the talc content is 10% weight to 30% weight of the cohesive breaking intermediate layer.

11. The composite film in accordance with claim 1, wherein the cohesively breaking intermediate layer is comprised of polypropylene, talc and low density polyethylene.

* * * * *